Patented Aug. 7, 1951

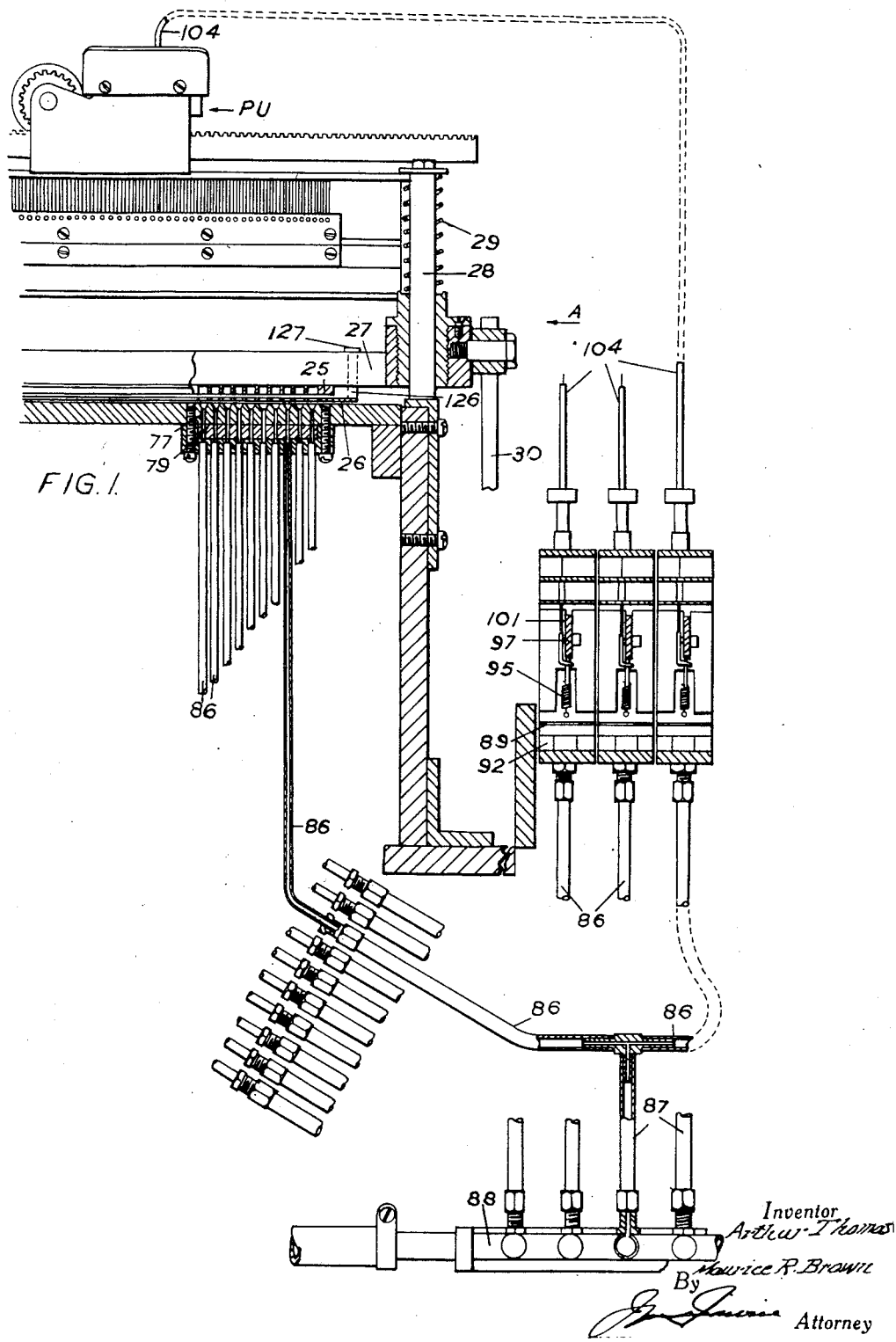

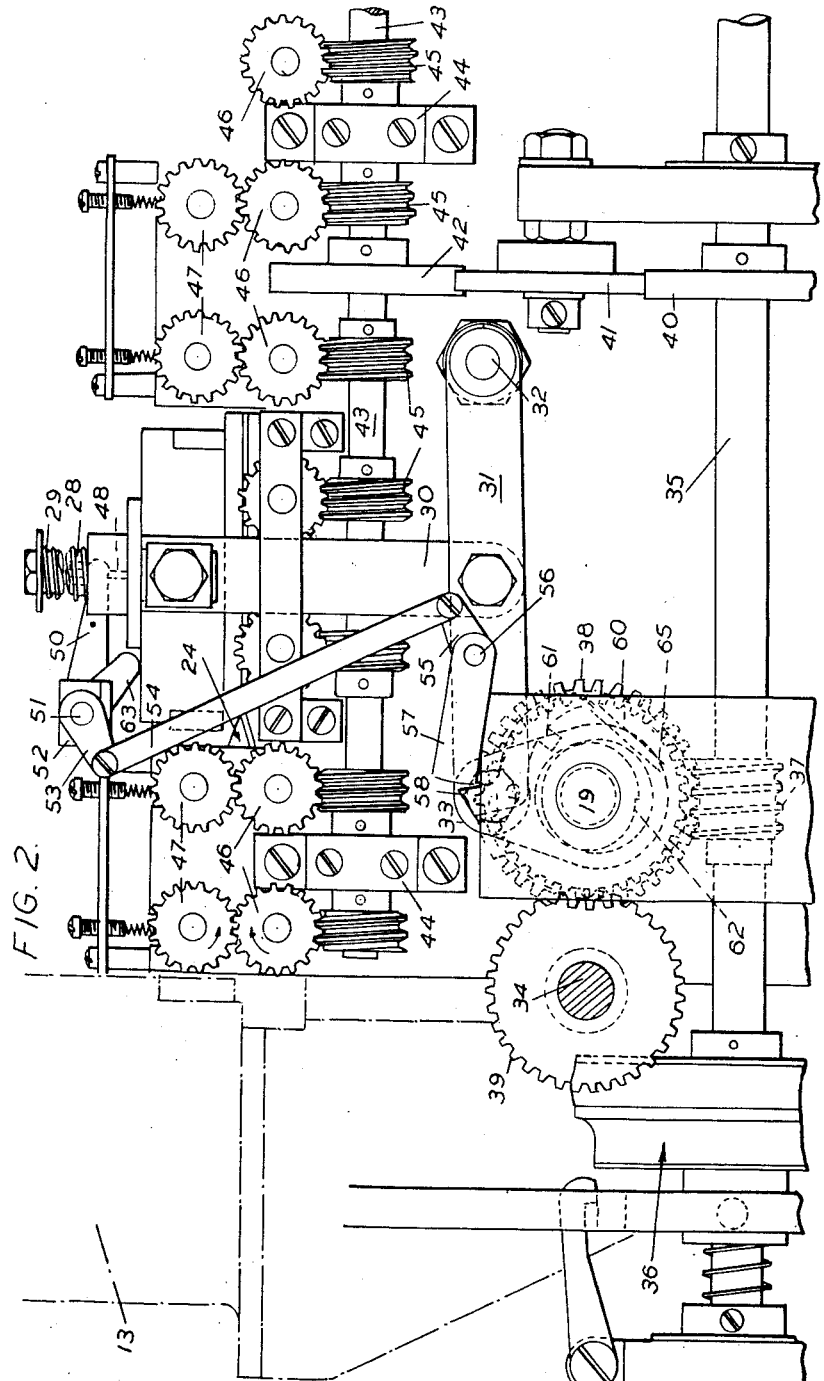

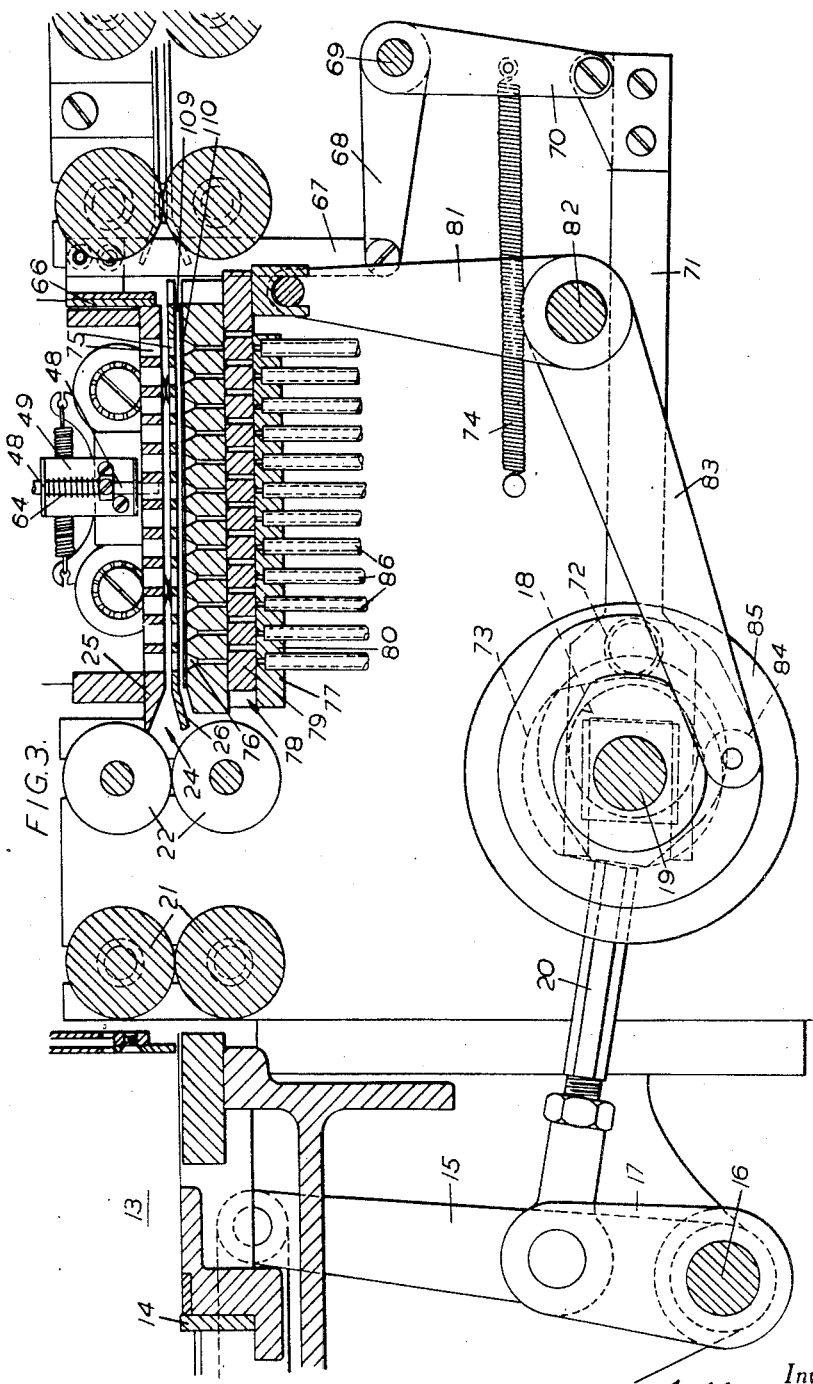

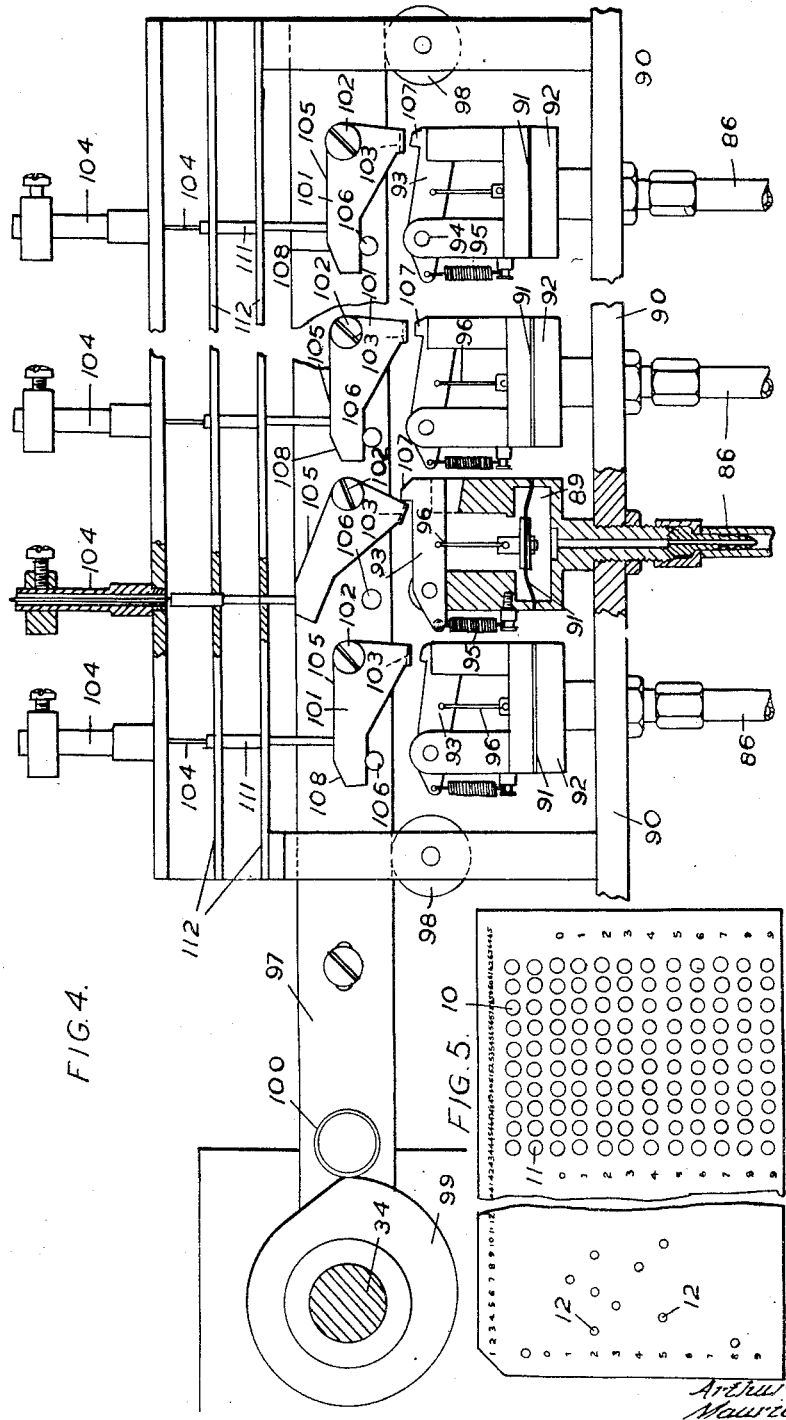

2,563,290

UNITED STATES PATENT OFFICE 2,563,290

PNEUMATIC SENSING MECHANISM FOR RECORD-CONTROLLED STATISTICAL MACHINES

Arthur Thomas, Wallington, and Maurice Richard Brown, Putney, London, England, assignors to Powers-Samas Accounting Machines Limited, London, England, a British company Application May 10, 1950, Serial No. 161,096
In Great Britain May 20, 1949

10 Claims. (Cl. 235—61.11)

This invention relates to statistical machines and more particularly to apparatus for use therein for sensing perforations in statistical record cards.

It is an object of the invention to provide a sensing apparatus for sensing perforations by the controlled use of negative pressure, whereby the negative pressure is operative to sense a card in timed relation with the movements of the card to and from the sensing position.

A further object of the invention is to combine with the sensing mechanism an apparatus adapted as the result of a sensing operation to condition a machine member to control a further machine function, for example, the punching of a record card.

According to the invention there is provided apparatus for sensing perforations in a perforated statistical record card, wherein a stationary sensing chamber has a through passage for each card index position to be sensed and a card chamber movable into and out of sealing engagement with the sensing chamber has apertures aligned with said through passages, a valve member operable in timed relation with the movements of the card chamber into and out of engagement with the sensing chamber being arranged simultaneously to permit or prevent the access of a negative air pressure to the through passages.

Further according to the invention there is provided for sensing perforations in a perforated statistical record card, apparatus comprising a sensing chamber provided with a through passage for each card index position to be sensed, means to apply negative pressure simultaneously and independently to each passage, a card chamber to receive a record card, the card chamber being provided with apertures aligned with the through passages in the sensing chamber, operating means to move the card chamber into and out of sealing engagement with the sensing chamber, and a valve member operable in timed relation with the operating means simultaneously to expose or close the through passages to negative pressure.

The means for applying negative pressure to the sensing chamber may include a conduit associated with each through passage, each said conduit being also associated with means adapted, consequent upon the reduction of negative pressure in the conduit as a result of a card perforation being sensed, to render effective a member for engagement by an actuator positively movable towards and away therefrom in timed relation with the operation of the valve and the card chamber to effect actuation of a machine member associated therewith.

In one embodiment of the invention the machine member comprises a pivotably mounted latch connected to a diaphragm which under the influence of the normally applied negative pressure urges the latch to one of two positions against the action of a spring, the spring acting on reduction of the negative pressure to urge the latch to the other of said two positions.

In order that the invention may be more clearly understood, an embodiment thereof will now be described by way of example with reference to the accompanying diagrammatic drawings in which:

Figure 1 diagrammatically illustrates sensing apparatus according to the invention adapted to effect actuation of flexible wires for conditioning punching mechanism, Figure 2 is an elevation looking in the direction of arrow A, Figure 1, and shows the driving mechanism, Figure 3 is a section, to an enlarged scale, through the sensing mechanism, looking in the direction of arrow A, Figure 1, Figure 4 is a broken view, partly in section, of the apparatus for operating the flexible wires for conditioning the punching mechanism, and Figure 5 is a broken view of a record card employed in the apparatus shown in Figures 1 to 4.

Referring to the drawings, the apparatus about to be described is for use with a record card as shown in Figure 5. This card is provided with a field having index positions defined by circles 10, printed or otherwise marked thereon. These marked positions are each of a diameter greater than that of a round hole perforation such as is normally punched in a card for controlling the operation of a statistical machine such, for example, as a tabulator or a sorter.

A card as shown in Figure 5 may be punched at the source from which information is obtained, e. g., by a meter-reader at the place where a meter is read, the perforations being made manually with a piercing instrument of small diameter, e. g., the diameter of the small hole may be of the order of 0.04 inch. Accuracy of punching is not essential provided always that the small hole is punched within the area prescribed by the appropriate circle marked on the card. Thus the small holes 11 may be as shown in Figure 5.

The card perforated with small holes is fed to a combined sensing and punching apparatus as described below and the information contained in the card field with the small perforations is sensed and reproduced in another field of the card by round hole perforations 12 of normal size as illustrated at the left hand side of the card shown in Figure 5.

Alternatively, the "normal" punching effected can, if desired, be of the known slotted type. The card when provided with "normal" punching can be employed in the usual way to control a statistical machine such as a tabulator.

To permit use of the full capacity of the card for "normal" punching, the positions for the small holes are defined in the card areas disposed between the normal horizontal row positions, these areas being those sometimes employed for what is known as interstage punching.

Cards having small hole perforations as above described are placed in a magazine 13, Figures 2 and 3, from which they are fed one at a time by a picker 14 oscillated by arm 15 on rock shaft 16. The shaft 16 is rocked by a rocker arm 17 secured thereto and operated by an eccentric 18 on a cross-shaft 19 through an eccentric strap 20.

A card fed by the picker 14 is delivered to feed rollers 21, 22 into a card receiving chamber 24 comprising a top plate 25 and a bottom plate 26 both carried on a carriage 27, see Figure 1, mounted for vertical reciprocation on pillars 28 against the action of springs 29. Vertical reciprocation of the carriage is effected by arms 30, Figures 1 and 2, at opposite sides of the machine, the arms being connected at their lower ends to rocking arms 31 pivoted at 32 to the machine frame and connected to an eccentric strap 33 on the cross-shaft 19 driven from the main shaft 35.

The main shaft is driven by an electric motor, not shown, and is clutched in known manner to the motor shaft by a clutch 36. A worm gear 37 on main shaft 35 drives a gear wheel 38 fixed on cross-shaft 19 and a further gear wheel 60 on shaft 19 drives a gear wheel 39 on a second cross-shaft 34. The feed rollers 21, 22 and other feed rollers for feeding a card out of the sensing chamber are driven from the main shaft through gearing 40, 41 and 42 which rotates a shaft 43 mounted in bearings 44. The shaft 43 carries worms 45 which drive the pairs of gears 46, 47 to effect rotation of the feed rollers.

The presence of a card in the card chamber 24 is detected by a detector pin 48, Figures 2 and 3, mounted in a bracket 49 on the carriage 27. The upper end of the pin 48 is engaged by a lever 50 secured to a spindle 51 mounted in brackets 52. To one end of spindle 51 is secured an arm 53 connected to one end of a link 54 whose other end is connected to an arm 55 on a spindle 56 having a latch 57 secured thereto.

When, as shown in the drawings, no card is in the card chamber the latch 57 is disposed in the path of a clutch pawl 58 pivoted at 59 to the gear wheel 60 which is free to rotate on the cross-shaft 19 thus preventing a dog 61 on pawl 58 from being engaged by a clutch member 62 secured to the cross-shaft 19. Thus the driving connection is broken and the cross-shaft 34 is not operated. The presence of a card in the card chamber 24 causes the latch 57 to be lifted out of the path of the pawl 58 allowing the dog 61 to engage with the clutch member 62 and thus causing the gear to rotate and so drive the shaft 34 through the gear 39.

A lever 63 on spindle 51 engages the top of the carriage 27 so that the upward movement of the carriage causes the pin 48 to be lifted clear of the path of the card to allow the card uninterrupted entry into the card receiving chamber 24. On being lowered the carriage moves away from the lever 63 and the pin 48 is moved downwards by its spring 64. If a card is positioned in the chamber 24 the pin 48 is arrested thereby and prevents the latch 57 from engaging with the pawl 58, the dog 61 thereby being urged by the spring 65 into the path of the clutch member 62.

When a card is fed into the chamber 24 by the rollers 22 it is located in the chamber by a card stop 66 carried at the upper end of an arm 67 the lower end of the arm being connected to an arm 68 secured to a spindle 69. A further arm 70 is also secured to the spindle 69 and to an arm 71 on which is mounted a cam roller 72 urged by a spring 74 into engagement with a cam 73 on the cross-shaft 19. The cam moves the card stop 66 into and out of card arresting position.

Each of the plates 25, 26 is provided with apertures 75, one for each index position denoted by a circle 10 on a card, each aperture 75 being aligned with one of a corresponding number of bell-mouthed apertures or through passages 76 in a sensing chamber 77 fixed to the machine frame below the card chamber. The apertures 76 are interrupted by a longitudinal passage 78 formed in the chamber 77 and the passage 78 houses a valve member 79 slidable in the passage 78 and provided with apertures 80 adapted to be aligned with the apertures 76. The valve member 79 is reciprocated lengthwise in the passage 78 in timed relation with the movements of the card chamber by an arm 81 secured to a rock shaft 82. A further arm 83 secured to rock shaft 82 carries a cam roller 84 co-operating with a box-cam 85 on shaft 19.

To the underside of the sensing chamber there is secured the ends of a plurality of conduits 86, one for each aperture or through passage 76. Each conduit 86 is connected by a branch conduit 87 to a main feed pipe 88, Figure 1, the pipe 88 being connected at each of its opposite ends to any suitable suction pump, not shown. The conduits 86 are also each connected to a latch operating chamber 89, Figures 1 and 4.

In Figure 4 one of the latch operating chambers 89 is shown in section and the chambers 89 are mounted on a plate 90 fixed to the machine frame, the chambers being arranged in columns corresponding to the index positions in vertical columns of the card field provided with the circles 10. Thus twelve chambers 89 comprise a column and Figure 4 shows such a column broken away for the sake of clarity, only four of the twelve chambers being illustrated.

A flexible diaphragm 91 is housed in each chamber 89 and has its edges securely clamped in a housing 92 for the chamber. A latch 93 is pivoted at 94 to the housing 92 and is urged in one direction by a spring 95. The latch is also connected with the diaphragm 91 by a link 96, the arrangements being such that when normal negative pressure is applied to the diaphragm the latter is in the reverse position from that shown in section in Figure 4 and the latch 93 is retained in inoperative or ineffective position by the diaphragm against the action of the spring 95.

Above each column of chambers 89 is an actuator carriage comprising a bar 97 mounted on rollers 98 for lengthwise reciprocation by a cam 99 on shaft 34, the cam acting on a roller 100 on the bar 97. A spring, not shown, maintains cooperation between the roller 100 and cam 99.

The bar 97 carries twelve actuators formed as catches 101, one for each latch 93, each catch being pivoted at 102 to the bar and having a lateral tongue 103 to be engaged by its associated latch 93 when the latter is conditioned to actuate its catch.

A Bowden wire 104 is associated with each catch 101 and is arranged for actuation by a plunger 111 supported in guides 112. The bottom face of the plunger 111 normally rests on a horizontal face 105 of the catch, the catch then being retained in position against a pin 106 extending laterally from the bar 97. When the bar 97 is moved to the right of Figure 4 by the cam 99 and the latch 93 has been conditioned as shown in section in Figure 4 the tongue 103 of the catch associated with the conditioned latch is engaged by a projection 107 on the latch thus rotating the catch about its pivot 102 so that the plunger 111 slides on the face 105 of the catch to a further face 108. The upward movement of the plunger actuates the Bowden wire and the plunger remains in its raised position until the bar 97 is retracted by cam 99. The Bowden wires are connected to a punch unit PU, Figure 1 in the manner described in United States Patent Specification No. 2,401,671 and operates to condition punches as therein described, the punch unit being similar to that described in United Kingdom Patent Specification No. 490,358. As the construction of the punch unit and the manner of operation thereof by the Bowden wires is well known it is not necessary to enter herein into a detailed explanation thereof.

In operation, a card is fed into the card chamber 24 and the chamber is then lowered into airtight sealing engagement with the sensing chamber 77, a good seal being ensured by a compressible, e. g. a rubber, packing 109, Figure 3, the packing being provided with apertures 110 aligned with the apertures 75, 76.

An airtight seal is further ensured by the arrangement of the plates 25, 26 of which the plate 26 is movable relative to the plate 25. Thus referring to Figure 1, the plate 26 is carried at the lower ends of pins 126 having heads 127 and passing through holes in the carriage 27. On the carriage being lowered to sealing position the plate 26 is arrested against the packing 109 and the plate 25, under the influence of the springs 28, causes the plate 25 to move downwards away from the heads 127 of pins 126 so that the card is compressed between the plates 25, 26. On the carriage 27 being raised it again engages beneath the heads 127 of pins 126 and thus causes plate 26 to be lifted out of engagement with the packing 109.

The valve member 79 is then moved to the left of Figure 3 so that its apertures 80 are aligned with the aperture 76. Negative pressure from the conduit 86 is thus applied to the card and where the card is provided with a small perforation, the negative pressure in the corresponding conduit is reduced so that the spring 95 overcomes the diaphragm 91 associated therewith thus conditioning its latch 93. On movement of the bar 97 to the right of Figure 4 the conditioned latches actuate their associated catches as above described thus effecting actuation of the Bowden wires and conditioning the punch unit to punch in the card, in the next cycle, a representation of the small hole perforations sensed by the pneumatic sensing mechanism. The holes punched by the punch unit are "normal" holes such as can be sensed by the kind of sensing mechanism employed with a statistical machine such as a tabulator or a sorter.

The valve member 79 is restored to the cut-off position shown in Figure 3 before the carriage 27 is raised from the card sensing position but there remains in those apertures 76 which are covered by imperforate card areas a residue suction acting to draw the card downwards. This residue suction effect is positively overcome when the carriage 27 is raised due to the plate 26 positively lifting the card upwards.

The operation of the valve member 79 in timed relation with movements of the card chamber 24 permits cards to be fed into and out of the chamber without hindrance from the constant negative pressure in the conduits 86 and the positive actuation of the bar 97 also in timed relation with the card chamber and the valve member permits the provision of mechanism for conditioning punches or other mechanism independent of air pressure. Further, the provision of the sensing pin 48 and its associated apparatus ensures that the bar 97 is not actuated if no card is present in the card chamber during a sensing operation.

Although in the foregoing example the sensing mechanism has been described as sensing small hole perforations and reproducing the pattern thereof in the same card, but in another field thereof, with normal card perforations, the mechanism can, if desired, be employed for sensing record cards provided only with "normal" punching.

Further, the machine function controlled as a result of the pneumatic sensing may be other than that of punching, for example, the function may comprise the conditioning of printed elements in a tabulating machine or the conditioning of receiving pockets in a sorting machine.

We claim:

1. For sensing perforations in a perforated statistical record card, apparatus comprising a sensing chamber provided with a through passage for each card index position to be sensed, means to apply negative pressure simultaneously and independently to each passage, a top plate and a bottom plate between which a card is located for sensing, the said plates each having apertures aligned with the through passages in the sensing chamber and being mounted for movement relative one to the other so that they are spaced apart to permit the movement of a card into and out of sensing relation therewith, the card is compressed therebetween during sensing, and is positively moved thereby away from the sensing chamber to overcome the action of residue negative pressure, a reciprocable carriage to move said plates to and from sealing engagement with the sensing chamber, operating means for said carriage, and a slide valve interposed between the sensing chamber and said negative pressure applying means and operable in timed relation with the operating means simultaneously to expose or close the through passages to negative pressure.

2. Apparatus for sensing perforations in a perforated statistical record card, comprising in combination, a sensing chamber provided with a through passage for each card index position to be sensed, means including a conduit for each through passage to apply negative pressure simultaneously and independently to each passage, a top plate and a bottom plate between which a card is located for sensing, the said plates each having apertures aligned with the through passages in the sensing chamber, and being mounted for movement relative one to the other so that they are spaced apart to permit the movement of a card into and out of sensing relation therewith, the card is compressed therebetween during sensing, and is positively moved thereby away from the sensing chamber to overcome the action of residue negative pressure, a reciprocable carriage to move said plates to and from sealing engagement with the sensing chamber, operating means for said carriage, a slide valve interposed between the sensing chamber and said negative pressure applying means and operable in timed relation with the operating means simultaneously to expose or close the through passages to negative pressure, a machine member for actuation on reduction of negative pressure in a conduit as the resut of a card perforation being sensed, an actuator positively movable towards and away from said machine member to effect actuation thereof in timed relation with the operation of said valve member, a conditioning member to condition said actuator to effect movement of the machine member, and means operable on the reduction of negative pressure in said conduit to render said conditioning means effective.

3. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, the card chamber being provided with apertures aligned with the through passages in the sensing chamber, a perforated resilient packing disposed between the sensing and card chambers to form an air tight seal therebetween when the card chamber is moved into sealing engagement with the sensing chamber, the perforations in the packing being alinged with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a machine member for actuation on reduction of negative pressure in a conduit as the result of a card perforation being sensed, an actuator positively movable towards and away from said machine member to effect actuation thereof in timed relation with the operation of said valve member, a latch operating chamber associated with said conduit, a reciprocable carriage for said actuator, a cam and cam shaft rotatable in timed relation with the operation of said valve member to reciprocate said carriage to effect movement of the actuator relative to the machine member, a diaphragm in the latch operating chamber, a latch pivoted to the latch operating chamber and connected with the diaphragm to condition said actuator to effect movement of the machine member, and a spring to urge said latch to one of two positions, said diaphragm being operable when normal negative pressure is applied to the operating chamber to urge said latch to one of its said two positions against the action of the spring and the spring acting on reduction of negative pressure in the operating chamber to urge the latch to the other of its said two positions.

4. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, the card chamber being provided with apertures aligned with the through passages in the sensing chamber, a perforated resilient packing disposed between the sensing and card chambers to form an airtight seal therebetween when the card chamber is moved into sealing engagement with the sensing chamber, the perforations in the packing being aligned with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a plurality of machine members for actuation on reduction of negative pressure in said conduits as the result of card perforations being sensed, an actuator for each machine member, a reciprocable carriage for said actuator, a cam and cam-shaft rotatable in timed relation with the operation of said valve member to reciprocate said carriage to effect movement of the actuators relative to the machine members associated therewith, a latch operating chamber associated with each of said conduits, a diaphragm in each latch operating chamber, a latch pivoted to each latch operating chamber and connected with the diaphragm therein to condition its associated actuator to effect movement of the machine member associated therewith, and a spring for each latch to urge the latch to one of two positions, each said diaphragm being operable when normal negative pressure is applied to its operating chamber to urge its latch to one of the two positions thereof against the action of the spring associated therewith, the spring acting on reduction of negative pressure in the operating chamber to urge the latch to the other of its said two positions.

5. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, the card chamber being provided with apertures aligned with the through passages in the sensing chamber, a perforated resilient packing disposed between the sensing and card chambers to form an airtight seal therebetween when the card chamber is moved into sealing engagement with the sensing chamber, the perforations in the packing being aligned with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a plurality of machine members for actuation on reduction of negative pressure in said conduits as the result of card perforations being sensed, an actuator for each machine member, a reciprocable carriage for said actuators, a cam and cam-shaft, driving means including a clutch for said cam-shaft whereby the cam is operable in timed relation with the operation of said valve member to effect reciprocation of said carriage to effect movement of the actuators relative to the machine members associated therewith, a latch operating chamber associated with each of said conduits, a diaphragm in each latch operating chamber, a latch pivoted to each latch operating chamber and connected with the diaphragm therein to condition its associated actuator to effect movement of the machine member associated therewith, a spring for each latch to urge the latch to one of two positions, each said diaphragm being operable when normal negative pressure is applied to its operating chamber to urge its latch to one of the two positions thereof against the action of the spring associated therewith, the spring acting on reduction of negative pressure in the operating chamber to urge the latch to the other of its said two positions, clutch actuating means, and a detector movable with said card chamber to render said clutch actuating means ineffective if no card is present in the card chamber when the latter is moved into sealing engagement with the sensing chamber and thereby prevent actuation of the cam-shaft.

6. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, said card chamber including a top plate, a reciprocable carriage for the top plate, and a bottom plate mounted for movement with and relative to the top plate, the top and bottom plates each having apertures aligned with the through passages in the sensing chamber, a perforated resilient packing disposed between the sensing and card chambers to form an airtight seal therebetween when the card chamber is moved into sealing engagement with the sensing chamber, the perforations in the packing being aligned with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a machine member for actuation on reduction of negative pressure in a conduit as the result of a card perforation being sensed, an actuator positively movable towards and away from said machine member to effect actuation thereof in timed relation with the operation of said valve member, a latch operating chamber associated with said conduit, a diaphragm in the latch operating chamber, a latch pivoted to the latch operating chamber and connected with the diaphragm to condition said actuator to effect movement of the machine member, and a spring to urge said latch to one of two positions, said diaphragm being operable when normal negative pressure is applied to the operating chamber to urge said latch to one of its said two positions against the action of the spring and the spring acting on reduction of negative pressure in the operating chamber to urge the latch to the other of its said two positions.

7. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, said card chamber including a top plate, a reciprocable carriage for the top plate, and a bottom plate mounted for movement with and relative to the top plate, the top and bottom plates each having apertures aligned with the through passages in the sensing chamber, a perforated resilient packing disposed between the sensing and card chambers to form an airtight seal therebetween when the card chamber is moved into sealing engagement with the sensing chamber, the perforations in the packing being aligned with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a plurality of machine members for actuation on reduction of negative pressure in said conduits as the result of card perforations being sensed, an actuator for each machine member, a reciprocable carriage for said actuators, a cam and cam-shaft rotatable in timed relation with the operation of said valve member to reciprocate said carriage to effect movement of the actuators relative to the machine members associated therewith, a latch operating chamber associated with each of said conduits, a diaphragm in each latch operating chamber, a latch pivoted to each latch operating chamber and connected with the diaphragm therein to condition its associated actuator to effect movement of the machine member associated therewith, and a spring for each latch to urge the latch to one of two positions, each said diaphragm being operable when normal negative pressure is applied to its operating chamber to urge its latch to one of the two positions thereof against the action of the spring associated therewith, the spring acting on reduction of negative pressure in the operating chamber to urge the latch to the other of its said two positions.

8. Apparatus for sensing perforations in a perforated statistical record card comprising in combination, a sensing chamber provided with a through passage for each card index position to be sensed, means including a conduit for each through passage to apply negative pressure simultaneously and independently to each passage, a card chamber to receive a record card, said card chamber including a top plate, a reciprocable carriage for the top plate, and a bottom plate mounted for movement with and relative to the top plate, the top and bottom plates each having apertures aligned with the through passages in the sensing chamber, a perforated resilient packing disposed between the sensing and card chambers to form an airtight seal therebetween when the card chamber is moved into sealing engagement with the sensing chamber, the perforations in the packing being aligned with the through passages in the sensing chamber and the apertures in said card chamber, operating means to move the card chamber into and out of sealing engagement with the sensing chamber, a valve member operable in timed relation with the operating means simultaneously to expose or close the through passages to negative pressure, a plurality of machine members for actuation on reduction of negative pressure in said conduits as the result of card perforations being sensed, an actuator for each machine member, a reciprocable carriage for said actuators, a cam and cam-shaft, driving means including a clutch for said cam-shaft whereby the cam is operable in timed relation with the operation of said valve member to effect reciprocation of said carriage to effect movement of the actuators relative to the machine members associated therewith, a latch operating chamber associated with each of said conduits, a diaphragm in each latch operating chamber, a latch pivoted to each latch operating chamber and connected with the diaphragm therein to condition its associated actuator to effect movement of the machine member associated therewith, a spring for each latch to urge the latch to one of two positions, each said diaphragm being operable when normal negative pressure is applied to its operating chamber to urge its latch to one of the two positions thereof against the action of the spring associated therewith, the spring acting on reduction of negative pressure in the operating chamber to urge the latch to the other of its said two positions, clutch actuating means, and a detector movable with said card chamber to render said clutch actuating means ineffective if no card is present in the card chamber when the latter is moved into sealing engagement with the sensing chamber and thereby prevent actuation of the cam-shaft.

9. Apparatus according to claim 1, including a compressible packing located between said bottom plate and sensing chamber for compression therebetween, said packing having apertures aligned with the apertures in the bottom plate and the through passages in the sensing chamber whereby an airtight joint is formed between the opposed faces of the bottom plate and sensing chamber in the areas thereof bounding said apertures and through passages.

10. Apparatus according to claim 2, including a compressible packing located between said bottom plate and sensing chamber for compression therebetween, said packing having apertures aligned with the apertures in the bottom plate and the through passages in the sensing chamber whereby an airtight joint is formed between the opposed faces of the bottom plate and sensing chamber in the areas thereof bounding said apertures and through passages.

ARTHUR THOMAS.
MAURICE RICHARD BROWN.

REFERENCES CITED

The following references are of record in the file of this patent:

UNITED STATES PATENTS

| Number | Name | Date |
| --- | --- | --- |
| 1,829,925 | Golod | Nov. 3, 1931 |
| 2,054,811 | Goerlitz | Sept. 22, 1936 |
| 2,055,016 | Paris | Sept. 22, 1936 |
| 2,220,075 | Carlson et al. | Nov. 5, 1940 |
| 2,510,552 | Carroll et al. | June 6, 1950 |